Jan. 10, 1928.

R. L. HORSLEY 1,655,814

POCKETKNIFE

Filed June 11, 1926

INVENTOR

Robert L. Horsley

Patented Jan. 10, 1928.

1,655,814

UNITED STATES PATENT OFFICE.

ROBERT L. HORSLEY, OF MEMPHIS, TENNESSEE.

POCKETKNIFE.

Application filed June 11, 1926. Serial No. 115,255.

The invention relates to pocket knives and improvement thereon, and has for its object to produce knives at a minimum of cost, and which will be light in weight, and may be quickly and easily opened or closed. Another object is to produce knives having changeable blades, so that an old blade may be exchanged for a new whenever needed.

Figure 1:
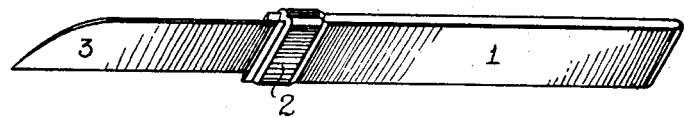
Figure 2:
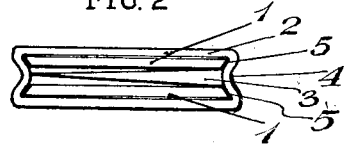
Figure 3:

One form of the invention is illustrated in the accompanying drawings, in which Fig. 1 is a perspective of the opened knife; Fig. 2 a plan view, looking toward the point of the knife; Fig. 3 a perspective of the knife closed up; and Fig. 4 an edge view of the handle, showing means to prevent accidental displacement of parts.

Handle 1 consists of a suitable strip of metal folded at the middle so the two halves thereof will lie alongside each other at a proper distance apart, and collar 2 is formed from a section of tubing or a strip, and is slidably fitted on said handle. The back end of blade 3 is made to fit tightly in collar 2, and is forced thereinto, where it may be held by friction, leaving space on either side for receiving the bifurcated parts of handle 1. With this construction and arrangement the collar, carrying the blade, may be quickly slid to position for opening or closing the knife.

As the edge of blade 3 should be covered when the knife is closed, collar 2 has a slight inward fold along its bottom edge, or along both top and bottom edges, shown in Fig. 2, as at 4. I prefer to use metal strips having their edges beveled toward one side for making handle 1, so that if the bevels are turned inward as shown at 5 5, folds 4 may be more easily made.

Figure 4:
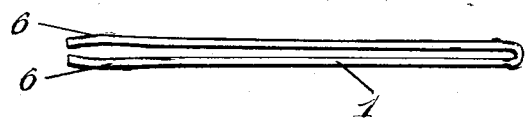

In order to prevent collar 2, with blade 3, from becoming accidentally detached from handle 1, in opening the knife, the two ends 6 6 of the strip forming said handle are slightly curved as shown in Fig. 4. Curves 6 6 are considerably exaggerated in the figure. Thus, it will require considerable force to start the handle into the collar or to remove it therefrom, while merely opening or closing the knife will require very little effort.

I claim:

1. A knife, comprising a handle, a slidable collar fitting on said handle and a blade fixed between inner longitudinal edges of said collar, said blade and collar, in combination, being detachable over the front end of the handle.

2. A knife, comprising a bifurcated handle, a slidable collar fitting around said handle and a blade fixed in said collar and being slidable therewith, said blade being carried between the sides of the handle and having its edge below the surface of the front edge of said handle.

3. A knife, comprising a handle having corresponding sides separated and free at the front end thereof, a slidable collar fitting on said handle, a blade fixed in said collar and being slidable therewith, and means consisting of formations bent in the free ends of said sides for preventing accidental detachment of the blade and collar over the front end of the handle.

4. A knife comprising a bifurcated handle, a slidable collar fitting around said handle, a blade fixed in said collar and being slidable therewith, means extending inwardly in the collar and registering with the edge of said blade for removing said edge from the surface of the handle, a slot on either side of the blade for receiving the bifurcated parts of said handle slidably therein, said slots being formed by the position of the blade in the collar, and means on the front end of the handle for preventing accidental detachment of the blade and collar from the handle thereat.

5. A knife, comprising a bifurcated handle having inwardly inclined bevels on adjacent edges of the sides thereof, a slidable collar fittting around said handle and having an inward fold fitting in with said bevels, a blade fixed in said collar and being slidable therewith and having the edge of said blade in contact with said fold for removing said edge from the surface of the handle, a slot on either side of said blade for receiving the bifurcated parts of the handle slidably in the collar, and means on the front ends of the bifurcated parts of the handle for preventing accidental detachment of the blade and collar over the end of the handle.

6. A knife handle having corresponding sides separated and free at the front end thereof and adapted for receiving a slidable collar thereon and for receiving, endwise between its sides, a blade fixed in said collar, and having means consisting of formations bent in the free ends of said sides for preventing accidental detachment of the blade and collar over the front end of the handle.

7. In a knife, the combination of a blade with a slidable collar, said collar fitting around a bifurcated handle and holding said blade between the bifurcated parts of said handle and below the surface thereof, said combination forming a slot on either side of the blade and within the collar for receiving said bifurcated parts slidably therein.

In testimony whereof I hereunto affix my signature.

ROBERT L. HORSLEY.